June 14, 1955 — S. HEYMAN — 2,710,441
CAPACITORS
Filed March 8, 1946 — 3 Sheets-Sheet 1
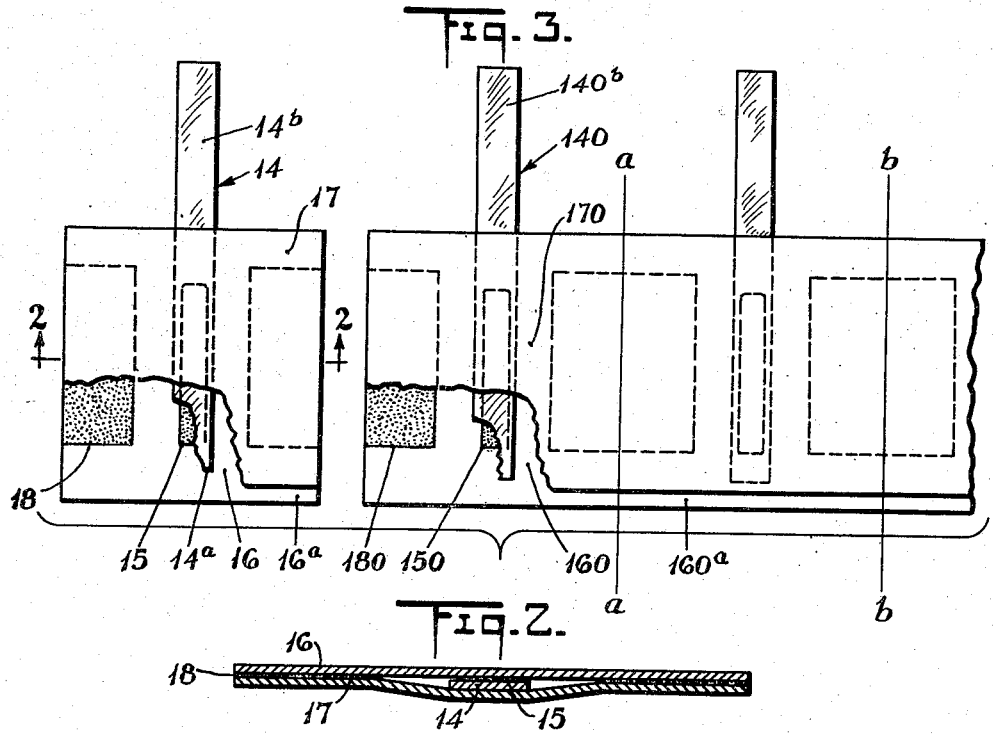
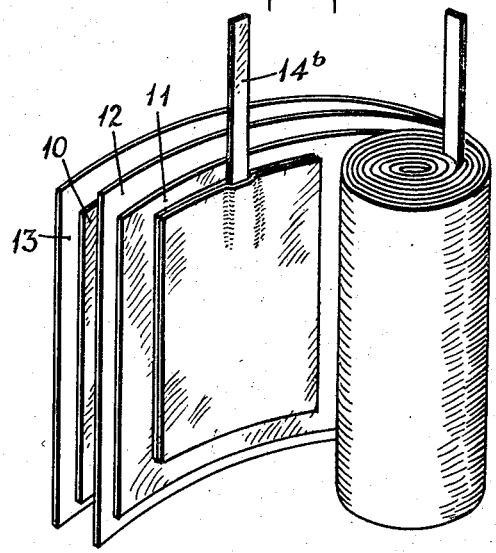
INVENTOR
Sam Heyman
BY
ATTORNEYS

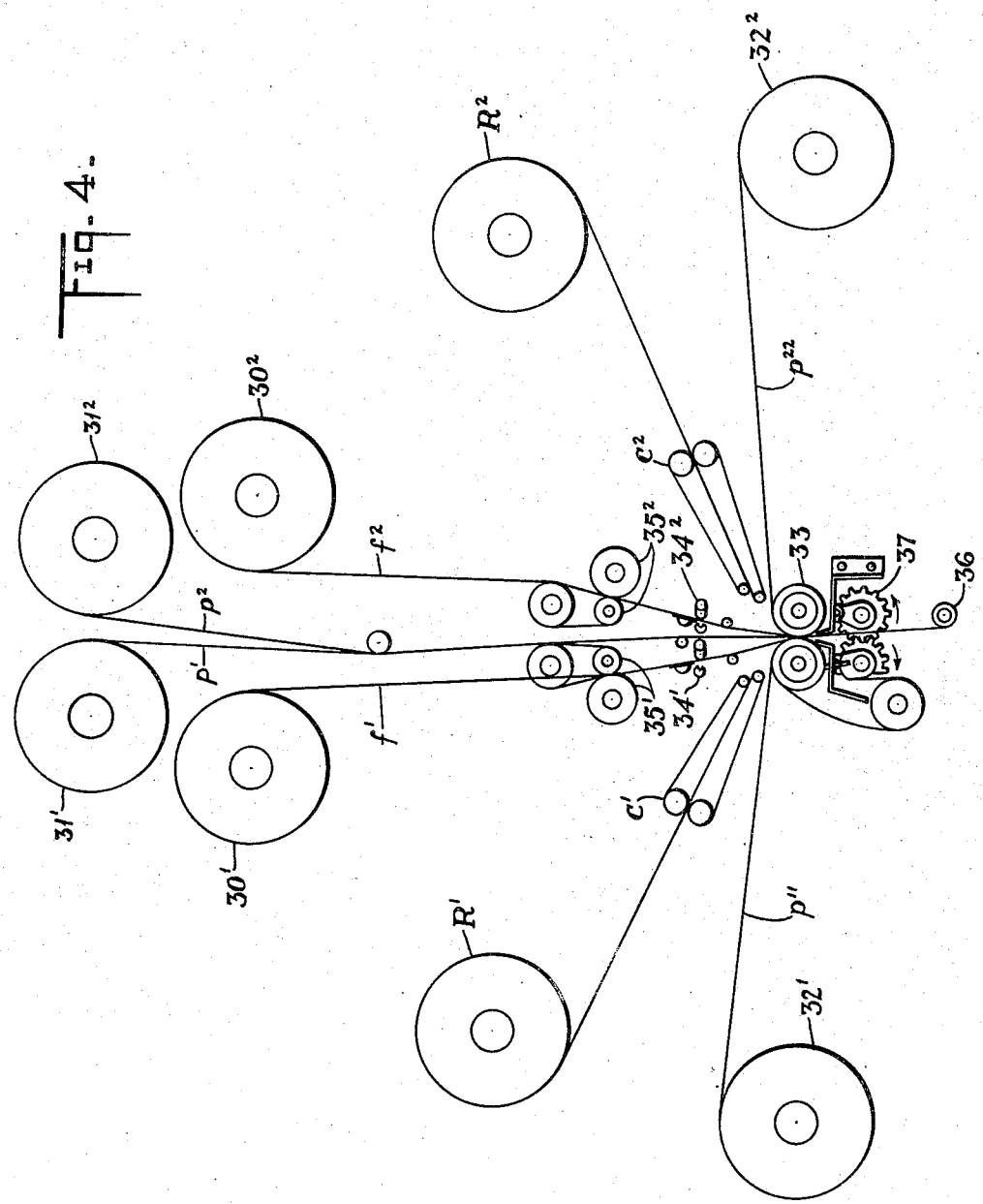

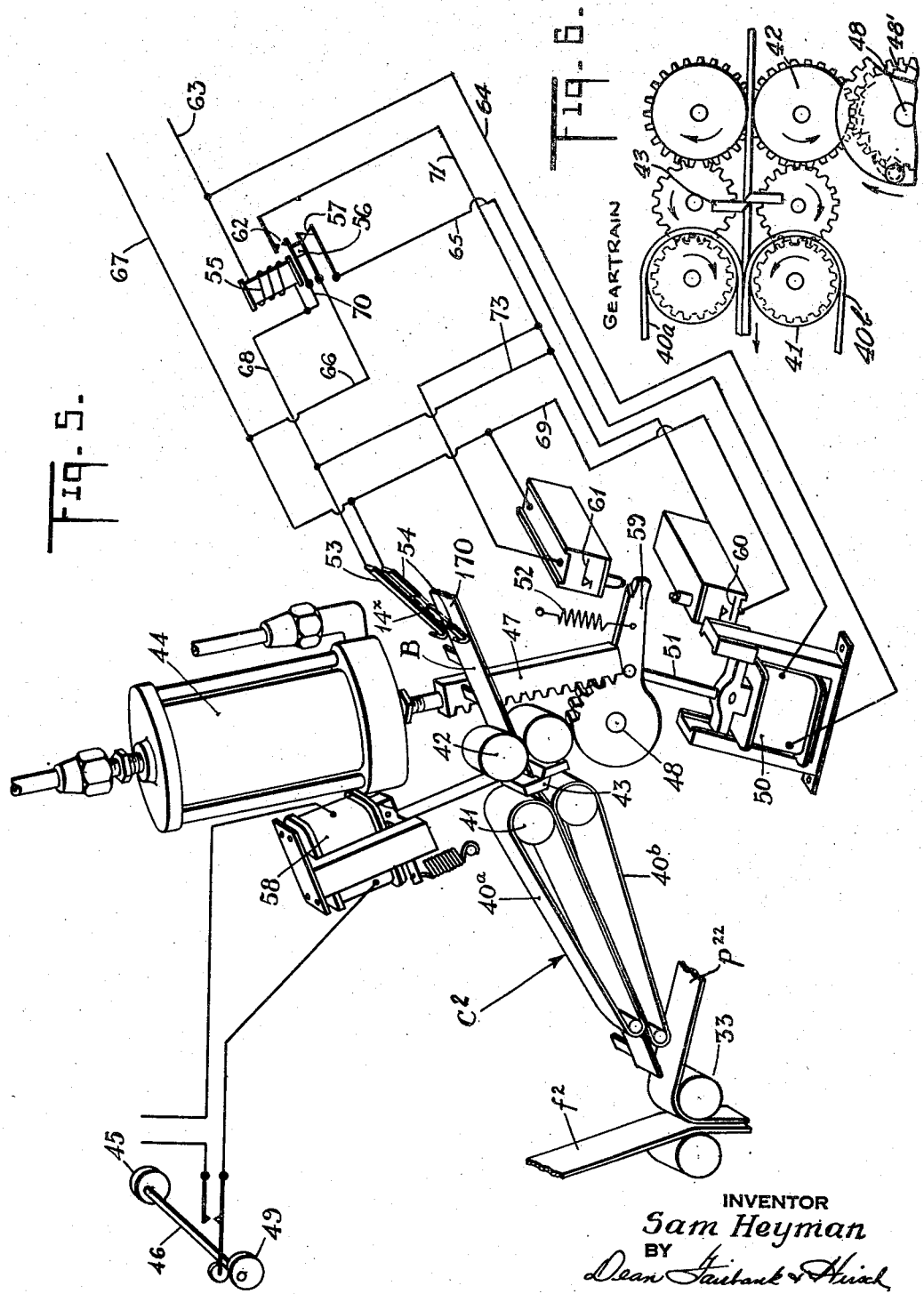

United States Patent Office 2,710,441
Patented June 14, 1955

2,710,441
CAPACITORS

Sam Heyman, New Bedford, Mass., assignor to Aerovox Corporation, a corporation of Massachusetts Application March 8, 1946, Serial No. 652,923

14 Claims. (Cl. 29—25.42)

The present invention is concerned with electric capacitors, and more especially with capacitors of the inductively wound or rolled type, the electrodes of which are equipped with protruding terminal tabs.

As conducive to a clear understanding of the invention, it is noted that, despite the advantage of facility in soldering the terminals onto capacitor electrodes made of tinfoil, that metal has largely been superseded in capacitors, by reason of its cost, and has been replaced by the much cheaper aluminum foil. The latter, however, admits of solder connection only by resort to special alloy solders that are subject to a number of disadvantages, among which are that such solders commonly react with the impregnating oils and therefore cause corrosion.

Where it is attempted to overcome such difficulty by dispensing with the soldering operation and introducing aluminum foil or tinned copper foil tabs by winding them between the convolutions of the foil, the sharp edges of such tabs cause excessive strain on the paper dielectric which promotes breakdown of the capacitor in service. Moreover, such terminal tabs, especially when used with flat rolled capacitor sections wound on large arbors are subject to shifting from correct position. Aside from these difficulties, conventional capacitor winding machines must be stopped at predetermined intervals in the course of forming the capacitor roll to permit manual introduction of the terminal tabs, with consequent serious slowing down of the winding operation.

It is an object of the invention to provide a method of enrolling capacitors of the above type, which admits of expeditious and continuous uninterrupted fabrication of the roll by automatic winding machinery without the need for interrupting the winding to perform the tab insertion operation.

Another object is to provide a capacitor roll of the above type, the terminal tabs of which are securely and accurately positioned relative to the respective electrodes without the need for solder, rivets or other bonding agent, and this regardless whether the roll be flat or round, tightly or relatively loosely wound on a large or on a small mandrel.

Another object is to provide an enrolled capacitor, the terminal tabs of which, while of sharp edged sheet metal, are nevertheless adequately protected in the completed capacitor from exerting undue cutting pressure against the paper or other dielectric and the electrode sheets contiguous thereto.

In the accompanying drawings in which are shown one or more of various possible embodiments of the several features of the invention, Fig. 1 is a view in longitudinal cross section of a capacitor roll partly unwound to disclose the character of terminal tab construction, Fig. 2 is a view in transverse cross section, taken on line 2—2 of Fig. 3, Fig. 3 is a plan view with parts broken away to reveal the details of construction of a fragment of the terminal tab carrying or feed band used in the practice of the present invention, and showing one tab anchor strip cut away from the end of the feed band, Fig. 4 is a diagrammatic view of a capacitor winding machine for executing the method claimed herein, and Fig. 5 is a perspective view, more or less diagrammatic of the tab severing and feeding mechanisms, and, Fig. 6 is a fragmentary view of the gear train.

Referring now to the drawings, the capacitor unit, except for its terminal construction is conventional and comprises a pair of sheet metal, desirably aluminum electrode foils. These foils comprise foil 10 that extends substantially the entire length of the coil and foil 11, which in a single section unit would be of corresponding length and in a multiple section unit (not shown) would comprise two or more shorter lengths of foil longitudinally spaced along the foil 10. Interposed between the foil electrodes 10 and 11, and superposed over one of said electrodes, are sheets 12 and 13, respectively, of dielectric with marginal longitudinal edges beyond those of the foil. The dielectric sheets may each be of one or more plies of paper or of suitably treated regenerated cellulose or of other dielectric film. If the dielectric sheet is of porous structure, it is impregnated with suitable oil or wax. When the capacitor is wound into a roll, the successive convolutions of the foils are therefore spaced by convolutions of dielectric.

Each of the terminal tabs of which there is at least one for each electrode, comprises a narrow strip 14 of sheet metal such as aluminum or tinned copper, desirably of thickness and stiffness greater than that of the thin, limber electrode foil. The tab strips ordinarily have sharp lateral edges that are apt to cut into the adjacent foil or paper convolution of the capacitor roll. According to the present invention, the terminal tab has a root which extends as shown nearly the height of the capacitor roll, with the inner extremity 14$^a$ thereof spaced somewhat from the protruding margin of the paper, the said tab protruding from the opposite end of the enrolled condenser as at 14$^b$.

According to the invention, the terminal tab is mounted, desirably by adhesive connection 15 to a backing strip 16 of insulating sheet material and desirably of width nearly equal to the height of the capacitor and of length, transversely of the terminal tab, desirably of substantially the order of its width and in any event several times the width of the terminal tab. The backing strip 16 securely mounts the root of the tab within the capacitor roll, since it affords a large surface that is clamped between consecutive convolutions of the capacitor.

Preferably the tab mount includes a second strip 17 of metal foil, desirably of aluminum, superposed over the backing strip 16 but somewhat narrower than the latter. The width of strip 17 extends desirably from the edge from which the tap protrudes, and its opposite edge leaves a protruding margin 16$^a$ on the backing strip 16. Thus there are two plies, a backing ply 16 of paper and a metal foil ply 17, between which is sandwiched the root of the terminal tab 14 which, as above noted, is secured preferably adhesively to the backing ply 16. Desirably the foil ply 17 is secured to the paper backing ply 16 by areas of adhesive 18 at opposite sides of the tab, no adhesive being interposed between the tab itself and the foil, so as to assure dependable metal to metal contact between the latter.

Manifestly the superposed foil 17 over the tab 14 affords additional protection against cutting of the electrode sheet by the sharp lateral edges of the terminal tab 14 and enhances the effectiveness of electrical contact with respect to the tab by reason of the greater thickness of material and larger area of contact between the electrode, the foil ply 17 and the tab 14.

Thus, the capacitor produced by the construction set forth affords a secure anchorage for the terminal tab which is tightly held against shifting, regardless whether the capacitor be rolled as a round coil or a flat coil, whether it be tightly or loosely wound on a large or on a small mandrel. For, in any event, the area of anchor strip, whether of single ply, or as preferred, of the double ply shown, is of sufficient length to be tightly held between consecutive convolutions, even in flat capacitors at the sharply curved end turns of which it would inevitably be securely clamped.

Moreover, the two plies of tab anchorage, as above indicated, adequately protect the capacitor structure from injury or shortened life due to cutting or indenting by the sharp lateral edges of the roots of the terminal tabs. The extra layer of insulation 16 adds the extra dielectric necessary to compensate for the sharp edges of the terminal tab against the paper on one face, and the extra layer of foil 17 intervening between the other face of the tab and the armature foil protects the latter from injury by the sharp edges of said tab. The advantages of the construction as described are present, regardless whether the capacitor be assembled by hand or by automatic winding machinery.

The invention has a great advantage in readily admitting of the incorporation of the tab structure described into the capacitor roll by resort to automatic winding machinery which, unlike the winding machines in common use, need not be stopped in the course of winding each capacitor roll to permit manual introduction of each terminal tab thereinto.

For such purposes the terminal tab unit as above described, is but a segment of an elongated band, desirably wound on a reel or roll, which constitutes a sequence or multiplicity of the tab anchor strips. The band, as shown in Fig. 3, comprises a backing ply 160 of cellulosic or other insulating backing material, a multiplicity of parallel sheet metal tabs 140 adhesively affixed thereto at 150 at fixed intervals and protruding beyond one lateral edge thereof as at 140$^b$ and a long ply 170 of metal foil, preferably aluminum, extending the length of the backing ply 160, and superposed over the root lengths of the terminal tabs, flush with the edge of the backing ply from which the terminal tabs protrude, but desirably somewhat narrower than the backing ply to leave the margin 160$^a$. The foil ply is attached to the backing ply, desirably adhesively, at the areas 180 intervening between consecutive terminal tabs. Thus it will be seen that by severing the composite terminal feeding band successively at lines $a$—$a$, $b$—$b$, etc. the tab anchor strips to be incorporated into the capacitor sections may be readily formed.

In Figs. 4 and 5 is illustrated a method and mechanism shown more or less diagrammatically for controlling the severance of the tab anchor strips and the incorporation of the same into the capacitor roll. The winding machine schematically shown, includes a pair of electrode foil reels 30$^1$ and 30$^2$, each interposed between a pair of paper reels respectively shown at 31$^1$, 32$^1$ and 32$^1$, 32$^2$. Feed rollers 33 clamp and advance the two plies of foil $f^1$ and $f^2$, and the associated paper strips $p^1$, $p^{11}$ and $p^2$, $p^{22}$, respectively. The foils $f^1$ and $f^2$ are severed, illustratively by perforating means 34$^1$, 34$^2$ intermittently operated, following the gripping of the foil length immediately thereabove between rollers 35$^1$ and 35$^2$, respectively, so that in the tension produced on the foils in the winding of the plies upon the mandrel 36 therebelow, they will be severed and fed with the sandwiching paper plies past the feed rollers 33 and the cutter 37 below said rollers 33 severs the paper plies beyond the foil ends. The winding machine need not be more fully described since it is in wide and successful use and is not by itself the subject-matter claimed herein.

According to the invention, there are two reels R$^1$ and R$^2$ symmetrically arranged, each having a band thereon, such as shown in Fig. 3 above described, with uniformly spaced protruding terminal tabs thereon. Each reel R$^1$, R$^2$ feeds to an associated conveyor, desirably a belt conveyor C$^1$ and C$^2$ respectively, delivering into the feed rollers 33 to be thus introduced between the respective electrode foils $f^1$, $f^2$ and the adjacent paper strips $p^{11}$ and $p^{22}$ for feeding into the winding condenser roll.

Each feed conveyor C comprises a pair of coacting belts 40$^a$ and 40$^b$, propelled in the same direction about pulleys 41 with the inner runs thereof in engagement with each other as shown, securely to grip the severed tab anchor strips therebetween, so that they will not become misaligned in their feed toward the feed rollers.

In the specific arrangement shown, the composite terminal tab carrying band B from the reel R is passed between band feed rollers 42, thence past a cutter 43 into the belt conveyor C. The band feed rollers 42, as well as the conveyor belts, are propelled by a servo-motor 44 pneumatically operated preferably by a suitable air valve (not shown) controlled by a cam 45 on the cam shaft 46 of the winding machine. The servo-motor illustratively has a rack 47 protruding therefrom, meshing with a drive gear 48, which by a suitable gear train (Fig. 6) drives both the band feed rollers 42 and the pulleys 41 of the conveyor belts. The stroke of the servo-motor is preferably adjusted so as to advance the tap strip through a stroke less than the full length of the tab anchor strip, but preferably for the major part of such length, illustratively for about seventy-five (75%) per cent of such length.

The remaining advance of the tab anchor strip to attain full accurately measured advance preparatory to severing thereof is effected by a step-by-step movement controlled electromagnetically. To this end a solenoid 50 is arranged for its armature rod 51 (moved against the resistance of return spring 52) to operate the gear train intermittently by reason of the ratchet mechanism 48' shown in Fig. 5, each stroke to effect a small advance of the anchor strip, until the succeeding protruding end of a terminal tab 14$^x$ on the band B reaches a contact finger 53 and thus closes circuit to companion contact finger 54 through the conductive face 170 of the composite tab carrying band B. When that position is reached, circuit is closed to solenoid 55 to lift armature 56 and thereby to open switch 57 which interrupts the feed circuit to solenoid 50. At that time cam 49 on cam shaft 46 of the winding machine closes circuit, as shown, to solenoid 58 for actuating the knife 43 to sever the tab anchor strip, the forward end of which had already become gripped between the conveyor pulleys 41.

The intermittent or cycling action of the solenoid 50 is controlled from a lever 59 protruding from drive gear 48, to which the armature rod 51 of the solenoid 50 is pivoted and to which return spring 52 is desirably connected. The lever 59 at the end of its downward stroke, closes switch 60, which latter is normally open and at the end of its spring-urged return stroke opens switch 61 which is normally closed.

Switch 60 normally opens the circuit to coil 55 and switch 61 normally closes the circuit to coil 55 at such time as switch 62 is closed, said latter switch being closed whenever coil 55 is energized and armature 56 thereby lifted.

The operation of the mechanism just described for severing the measured lengths of tab anchor strips at the predetermined intervals will be clearly understood from the following description:

As the winding machine operates, the cam 45 on the cam shaft 46 at appropriate time opens the air valve for operating servo-motor 44 which through rack 47 drives gear 48 and through the associated transmission causes the band feed rollers 42 to advance the tab carrying band B forward across the open knife blades 43 and between the feeding conveyor rollers 41. In this operation, the brush 53 is clear of the tabs on strip B. Electromagnet 50 is now actuated by current flowing from main 63 through conductor 64 to solenoid 50 and thence through conductor 65, closed switch 57 and conductor 66 to the opposite main 67. The Core 51 is therefore pulled downward against the resistance of spring 52 to rotate the drive gear 48 and through the transmission further to advance the conveyor C and the band B through a small step. The arm 59 is moved downward with the solenoid rod 51 and at the end of its downward stroke, said arm closes switch 60. As a consequence, coil 55 is energized by current from main 63 through said coil 55 through conductor 68 and 73 to switch 60 and thence back by way of conductor 69 to the opposite main 67. The armature 56 is therefore attracted to open the switch 57 and thereby to interrupt the circuit to the electromagnet 50, so that the coil spring 52 returns the parts. In this return operation, reverse motion of the transmission is prevented by suitable means, such as an over-running clutch (not shown) on drive gear 48. During the return stroke of the solenoid 50, coil 55 remains energized despite the opening of switch 60. That circuit is from main 63, through coil 55, conductor 70 through closed switch 62, conductor 71, normally closed switch 61, and by way of conductor 69 to main 67. At the end of the return stroke, the arm 59 opens circuit through the normally closed switch 61, so that the circuit to coil 55 is now interrupted. As a consequence, coil 55 becomes de-energized, armature 56 drops and switch 57 recloses for energization of solenoid 50 and repetition of the cycle described.

The cycling described continues until brush 53 is contacted by the next terminal tab $14^x$ on the band B at which time the circuit passes from main 63 through coil 55, conductor 68, brush 53, tab $14^x$, conductor strip 170, through brush 54, and thence to main 67, the energized coil 55 thereby lifting armature 56 and opening contacts 57 to disable the electro-magnet 50, so that its cycling operation ceases. At this stage the correct length of tab anchor strip has been advanced and the cam 49 now closes the circuit to electro-magnet 58 and operates the knife 43. At predetermined intervals, the complete cycle of the operation of servo-motor 44, followed by the step-by-step advance by solenoid 50, is repeated. Thus the operation proceeds automatically, the tab anchor strips are advanced, gripped by the conveyor C at their advance ends, measured and accurately cut off, and are then advanced by the conveyor C without danger of misalignment and accurately fed between the feed rolls 33 of the capacitor winding machine. The various strips of which the capacitor section is formed are closely held together in the well designed capacitor winding machine, from the feed rolls 33 to the mandrel 36 as shown, so that the tab anchor strips do not become displaced in the movement past feed rollers 33 to mandrel 36. The cut off of the tab anchor strips is at predetermined intervals, for introduction of the tab anchor strips into the condenser roll at substantially the precise location desired, where such tab is securely held in the finished condenser section in the manner above set forth.

As many changes could be made in the above construction and many apparently widely different embodiments of this invention could be made without departing from the scope of the claims, it is intended that all matter contained in the above description or shown in the accompanying drawings shall be interpreted as illustrative and not in a limiting sense.

Having thus described my invention what I claim as new and desire to secure by Letters Patent of the United States is:

1. The method of introducing one or more terminal tabs into a capacitor roll of electrode and dielectric strips, which consists in mounting the terminal tabs to extend transversely of a longitudinal feed band, severing tab anchor strips from the end of the feed band and introducing the tab anchor strips into the capacitor where desired, in the course of enrolling the same, with the tabs facing and engaging the respective electrodes.

2. The method of enrolling a capacitor with terminal tabs protruding from various electrodes thereof, the latter being interposed between dielectric strips, which method consists in affixing terminal tabs transversely across a feed band to protrude transversely therefrom, severing a tab anchor strip from the end of the feed band, feeding the severed tab anchor strip into the capacitor roll as it is being formed, and repeating the sequence of severing and feeding for each terminal tab to be incorporated into the capacitor roll.

3. The method of enrolling a capacitor made up of two sets of electrodes with intervening and superposed dielectric strips and with terminal tabs protruding laterally from the roll, which method consists in mounting the tabs in parallel relation in two sets upon two feed bands extending in the general longitudinal direction of the several electrode and dielectric strips from which the capacitor is rolled, winding the several electrodes and dielectric strips upon a mandrel, severing a tab anchor strip from the ends of each tab feed band, and introducing between the forming convolutions the extremity of each severed tab anchor strip.

4. The method of enrolling a capacitor having electrode and dielectric strips with protruding terminal tabs engaging the respective electrodes, said method comprising the mounting of terminal tabs transversely of feed bands that extend generally lengthwise of and contiguous to the several electrode strips, advancing the extremities of said tab mounting bands at predetermined stages, severing the ends thereof into tab anchor strips, feeding the latter between the forming convolutions of the capacitor being wound, and repeating the cycle of severing and feeding at predetermined intervals in the course of enrolling the capacitor.

5. The method of enrolling a capacitor of the type comprising electrode strips, dielectric strips and terminal tabs electrically connected to the respective electrodes, which method consists in mounting the terminal tabs to protrude transversely from an edge of an insulating band generally longitudinally of an electrode strip and contiguous thereto, with the tabs facing said strip, severing the tab carrying band beyond one of the tabs to form a tab anchor strip, gripping the forward extremity of the latter and advancing the severed tab anchor strips thus gripped between convolutions of the forming capacitor, and at predetermined intervals repeating said cycle of severing a tab anchor strip, gripping and feeding it between convolutions.

6. The method of enrolling a capacitor of the type comprising electrode strips, dielectric strips and terminal tabs electrically connected to the respective electrodes, which method consists in mounting the terminal tabs to protrude transversely from an edge of an insulating band generally longitudinally of an electrode strip and contiguous thereto, with the tabs facing said strip, intermittently advancing said band, severing the same at predetermined intervals between consecutive tabs to form tab anchor strips, gripping and advancing said strips while the capacitor roll is being formed and introducing the severed strips in sequence into the forming capacitor roll at predetermined intervals.

7. The method of enrolling an electric capacitor that has electrode strips and intervening dielectric strips and is equipped with terminal tabs protruding laterally from the respective electrodes, which consists in affixing the terminal tabs to extend transversely beyond the edge of a composite tab feed band including an insulating ply and a metal foil ply, extending said tab feed band generally parallel to the electrode strips, with the foil ply contiguous to the electrode, advancing said composite tab feed band, severing the end of said band to form a tab anchor strip, while interrupting the further feed of said band, enrolling the capacitor and in the course of said enrollment advancing the extremity of the tab anchor strip to become clamped between successive convolutions of the forming capacitor roll.

8. The method recited in claim 7, in which the tab anchor strip is gripped and held gripped as it is severed and while being fed into the capacitor roll.

9. The method of winding a capacitor section with terminal tabs properly positioned therein, which consists in mounting the tabs to protrude transversely from an edge of a continuous band, insulating at one face and conducting at the other face thereof, severing from the end of the band successive strips, each having one tab, gripping the strips against misalignment, and while thus gripped, conveying the severed strips into the condenser roll being formed, and so controlling the intervals between successive severing operations as to dispose each tab carrying strip in the condenser section at the desired position.

10. In a capacitor winding machine of the type comprising reels with electrode material, reels with dielectric, feed rollers and cutters timed to sever the electrode and the dielectric strips at suitable times a reel having thereon a band with terminal tabs protruding from one edge thereof and affixed thereto at uniformly spaced intervals; the combination therewith of automatic terminal tab insertion means comprising means controlled in its timing from said winding machine for intermittently advancing said terminal tab carrying band and for intermittently severing the successive terminal segments therefrom to form tab anchor strips, a conveyer comprising a pair of coacting belts having discharge ends associated with said feed rollers, means to feed said anchor strips between said belts to be gripped thereby, and means actuating said belts to advance said anchor strips into the winding condenser roll for winding thereinto at the desired location.

11. In a capacitor winding machine of the type having a reel, a continuous band thereon having terminal tabs affixed transversely thereof and protruding from one edge thereon; the combination therewith of means for automatically introducing terminal tabs into the winding capacitor roll, said means comprising servo-motor means under control of the winding machine for advancing the band for the major portion of the length of a terminal tab anchor strip to be severed from said band, electromagnetic control means for subsequently intermittently stepping the band forward in a sequence of small steps until the desired length thereof has been advanced, and electric control means controlled by making circuit through one of the tabs on the band in the advance of the latter, for interrupting the intermittent operation and motor means in timed relation to the winding machine for severing successive tab anchor strips as required.

12. In a capacitor winding machine of the type having a reel, a continuous band thereon having terminal tabs affixed transversely thereof and protruding from one edge thereon; the combination therewith of mechanism for severing at the required intervals, terminal tab anchor strips from the end of a band, which comprises a conveyor for advancing the severed tab anchor strips into the winding capacitor roll, a servo-motor having a gear train under control thereof for operating the conveyor and advancing the strip through a step less than the length of the strip, a spring restored electromagnet for operating said conveyor, a pair of switches under control of said electromagnet at the opposite ends of the stroke thereof, one for disconnecting the electromagnet circuit at the end of an operative stroke and the other for reconnecting it at the end of its spring return stroke, means under control of a terminal tab in the advancing movement of the band for disabling the operation of said electromagnet, and means for severing the thus measured length of tab anchor strip when the feed operation thereof is thus discontinued.

13. In the process of winding capacitors having provision for moving adjacent strips of dielectric and conducting material along spaced path to winding means, the method of inserting a conducting tap strap therein which comprises the step of inserting a single piece of mounting material having a conducting tap strap affixed to a surface and projecting beyond an edge thereof between said moving and adjacent strips of dielectric and conducting material so that said mounting material with said tap strap will be seized by said moving adjacent strips and wound therebetween by said winding means.

14. In the process of winding capacitors having provision for moving adjacent strips of dielectric and conducting material along spaced paths to winding means, the method of inserting a conducting tap strap therein which comprises the step of inserting and end of a single piece of material having a relatively narrow conducting portion projecting beyond an edge thereof between and in frictional engagement with said moving and adjacent strips of dielectric and conducting material so that said piece of material will be seized by said moving adjacent strips and wound therebetween by said winding means.

References Cited in the file of this patent

UNITED STATES PATENTS

| 877,089 | Kock | Jan. 21, 1908 |
| 1,337,505 | Brinton | Apr. 20, 1920 |
| 1,393,077 | Brinton | Oct. 11, 1921 |
| 1,829,015 | Reiher | Oct. 27, 1931 |
| 1,926,842 | Dubilier | Sept. 12, 1933 |
| 2,040,323 | McCain | May 12, 1936 |
| 2,255,498 | Babilis | Sept. 9, 1941 |
| 2,328,520 | West | Aug. 31, 1943 |
| 2,333,966 | Weiss | Nov. 9, 1943 |
| 2,374,084 | Dubilier | Apr. 17, 1945 |